Oct. 19, 1943.  J. J. HOEHN  2,332,079
MOTION PICTURE APPARATUS
Filed Sept. 30, 1942
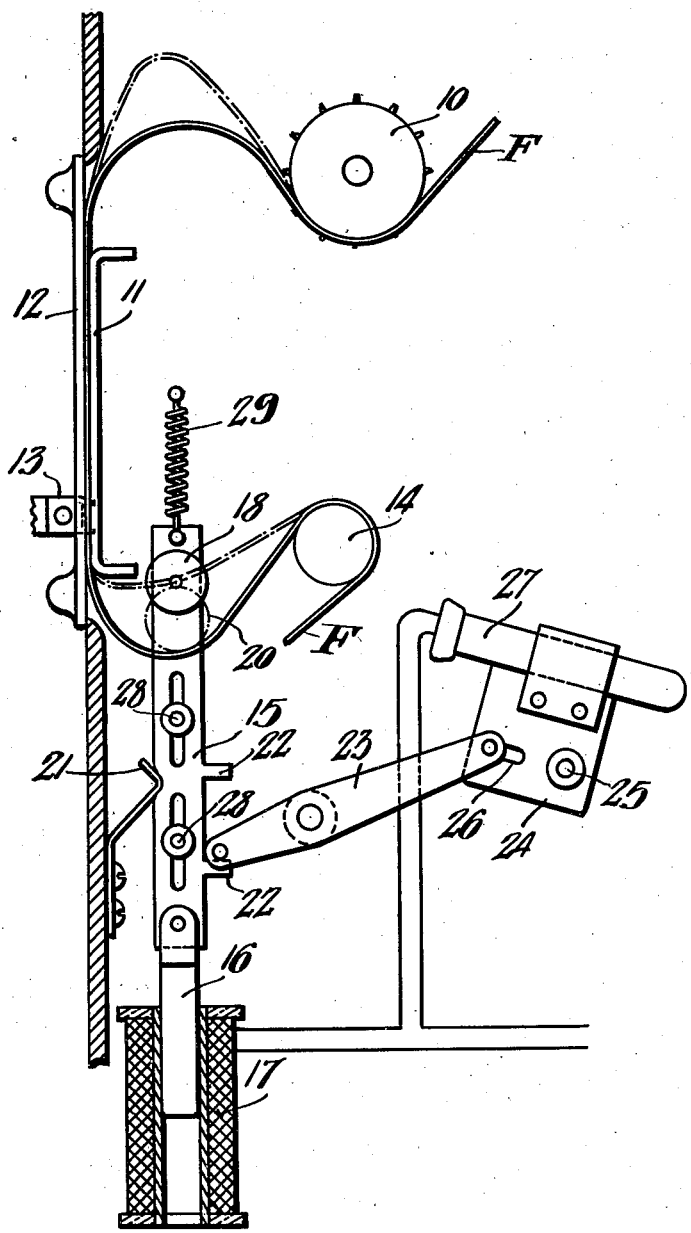
Inventor
John J. Hoehn
By
C. D. Tuska
Attorney Patented Oct. 19, 1943

2,332,079

UNITED STATES PATENT OFFICE 2,332,079

MOTION PICTURE APPARATUS

John J. Hoehn, Indianapolis, Ind., assignor to Radio Corporation of America, a corporation of Delaware Application September 30, 1942, Serial No. 460,299

3 Claims. (Cl. 88—18)

This invention relates to a loop restoring device for motion picture projectors having a feed mechanism of the claw type, and provides a means for automatically restoring the lower loop in such projectors when that loop is lost.

The invention involves a device which is contacted by the film when the film becomes taut between the lower sprocket and the film gate, and which thereupon is automatically actuated to restore the loop to its proper size, after which the mechanism returns to its normal midposition.

One object of the invention is to provide an improved means for restoring a loop in a motion picture apparatus.

Another object of the invention is to provide an automatic mechanism for restoring the lower loop in a motion picture apparatus.

Another object of the invention is to provide mechanism actuated by the film for restoring the loop in a motion picture apparatus.

Other and incidental objects of my invention will be apparent to those skilled in the art from a reading of the following specification and an inspection of the accompanying drawing.

The single figure of drawing is a diagrammatic side view of a motion picture projector provided with a loop restoring device in accordance with the present invention.

In the drawing, the film F is fed over the upper, continuously moving sprocket 10 and is then fed intermittently through the film gate, consisting of the stationary plate 12 and the spring pressed plate 11, by the intermittent claw 13. After passing through the film gate, the film passes in the form of a loop to the lower sprocket 14 which, like the upper sprocket 10, may be continuously driven. If the projector is of the sound reproducing type, instead of a sprocket at 14, a smooth roller may be used, provided with appropriate filtering mechanism to prevent the jerks of the film in the loop from being transmitted to the sound reproducer.

If the film is damaged at the sprocket holes, or if for some other reason the intermittent claw 13 fails to feed the film, the continuous takeup of the film over the wheel 14 causes the film to be drawn taut from the bottom of the gate shoe 11, while at the same time the loop of film between the sprocket 10 and the shoe 11 is enlarged.

A roller 18 is provided on a movable slide 15, this roller 18 being normally positioned as indicated, so that it is clear of the lower film loop. The slide 15 is provided with appropriate slots, movable on the fixed pins 28, or this slide may be appropriately guided.

The lower end of the slide 15 carries the core 16, which can be drawn into the solenoid 17 by current therethrough, and an appropriate spring 29 is provided for returning the slide 15 after it has been pulled down by the solenoid 17. A spring 21 is provided, fitting into a notch in the slide 15 when the slide is in its intermediate position, with the roller in the position indicated at 18.

The slide 15 is provided with a pair of spaced extensions 22, adapted to contact an extension on the arm 23. The arm 23, which is pivoted as shown, carries a pin on its other end which is movable in the slot 26 in the plate 24, which is pivoted at 25. The plate 24 carries a mercury switch 27 for closing the circuit to the solenoid 17 when the plate 24 is rotated counter-clockwise about its pivot at 25.

The operation of the device is as follows: When the motion picture projector loses its lower loop, the film is pulled taut between the bottom of the pressure shoe 11 and the roller 14. This pulls the roller 18 upwardly into the position indicated at 19. In this position, the lower projection 22 causes the arm 23 to to be rotated clockwise, thereby rotating the plate 24 and its switch 27 in a counter-clockwise direction, and closing the circuit to the solenoid 17, which is connected to an appropriate source of current (not indicated).

The current through the solenoid 17 causes the core 16 to be drawn downwardly, along with the connected mechanism. This moves the roller 18 downwardly to the position 20, restoring the lower loop by pulling the film past the intermittent claw 13. When the roller 20 reaches this lower position, the upper of the projections 22 has pulled the arm 23 about its pivot in a counterclockwise direction a sufficient distance to rotate the mercury switch 27 to the open position, thus opening the circuit through the solenoid 17.

When the circuit to the solenoid 17 is opened, the spring 29 pulls the slide 15 and its connected parts upwardly, so that the roller 18 is moved from the position 20 to its original position 18, and the spring 21 again engages the notch in the member 15, thus leaving the lower film loop free to move below the roller 18.

I claim as my invention:

1. In a motion picture machine having an upper constant speed film feeding mechanism, a lower constant speed film feeding mechanism and an intermittent film feed mechanism of the intermittent grip type between said constant speed film feed mechanisms and normally operating with a free loop of film between each of said constant speed film feeding mechanisms and said intermittent mechanism, mechanism for restoring the lower film loop including means normally out of contact with the film loop but contacted by the film when the loop is lost, means actuated by said film contacted by said film for controlling an electrical circuit, and electrical means connected in said circuit for actuating said film contacting means to restore the lower loop.

2. In a motion picture machine having an upper constant speed film feeding mechanism, a lower constant speed film feeding mechanism and an intermittent film feed mechanism of the intermittent grip type between said constant speed film feed mechanisms and normally operating with a free loop of film between each of said constant speed film feeding mechanisms and said intermittent mechanism, mechanism for restoring the lower film loop including means normally out of contact with the film loop but contacted by the film when the loop is lost, means actuated by said film contacted means when contacted by said film for controlling an electrical circuit, electrical means connected in said circuit for actuating said film contacting means to restore the lower loop, and means for restoring said film contacting means to its original position.

3. In a motion picture machine having an upper constant speed film feeding mechanism, a lower constant speed film feeding mechanism and an intermittent film feed mechanism of the intermittent grip type between said constant speed film feed mechanisms and normally operating with a free loop of film between each of said constant speed film feeding mechanisms and said intermittent mechanism, mechanism for restoring the lower film loop including means normally out of contact with the film loop but contacted by the film when the loop is lost, means actuated by said film contacted means when contacted by said film for controlling an electrical circuit, electrical means connected in said circuit for actuating said film contacting means to restore the lower loop, means for restoring said film contacting means to its original position, and means for retaining said film contacting means in said original position except when actuated by the film, the electrical means, or the restoring means.

JOHN J. HOEHN.